US006948731B2

United States Patent
Noer

(10) Patent No.: US 6,948,731 B2
(45) Date of Patent: Sep. 27, 2005

(54) ANTI-THEFT BICYCLE

(76) Inventor: Ole Martin Noer, c/o Anlmagisk AS, Industrivelen 33, Sandvika (NO), N-1337

(*) Notice: Subject to any disclaimer, the term of this patent is extended or adjusted under 35 U.S.C. 154(b) by 0 days.

(21) Appl. No.: 10/490,447

(22) PCT Filed: Sep. 25, 2002

(86) PCT No.: PCT/NO02/00343
§ 371 (c)(1),
(2), (4) Date: Aug. 24, 2004

(87) PCT Pub. No.: WO03/026948
PCT Pub. Date: Apr. 3, 2003

(65) Prior Publication Data
US 2005/0017478 A1 Jan. 27, 2005

(30) Foreign Application Priority Data
Sep. 28, 2001 (NO) .......................................... 2001 4741

(51) Int. Cl.⁷ .............................................. B62K 15/00
(52) U.S. Cl. ...................... 280/287; 280/279; 280/281.1
(58) Field of Search ................................ 280/278, 287, 280/288.4, 281.1, 279; 70/233, 234

(56) References Cited

U.S. PATENT DOCUMENTS 3,814,462 A * 6/1974 Kelly ......................... 280/287
4,022,485 A * 5/1977 Cox ........................... 280/287
4,441,729 A * 4/1984 Underwood ................. 280/278
5,205,573 A * 4/1993 Mhedhbi ..................... 280/287
5,558,349 A * 9/1996 Rubin ......................... 280/287
5,832,753 A * 11/1998 Nielsen ....................... 70/38 A
6,505,846 B1 * 1/2003 Hoffman ..................... 280/274

FOREIGN PATENT DOCUMENTS

GB 2146297 * 4/1985

* cited by examiner

Primary Examiner—Anne Marie Boehler
(74) Attorney, Agent, or Firm—Christian D. Abel

(57) ABSTRACT

A theft-proof bicycle comprising a frame structure consisting of three frame parts (1, 2, 3), which are connected so as to form a triangle, where the rod for the front wheel's supporting fork (4) is attached to the triangle's front corner (6), while the rear wheel's supporting fork structures are attached to the frame structure in the areas of the two other corners (7, 8) of the triangle. One of the frame parts (1) forming the triangle's front corner is designed with a holding sleeve for the rod for the front wheel's supporting fork (4). The sleeve is equipped with an extension and an aperture for passing through a locking pin. The second frame part in the area of this corner (6) is designed as a fork, one prong of which is passed on each side of the front wheel fork's rod. The supporting frame (1, 2, 3) is equipped in a corner (7) with a pivot joint in order to permit a relative movement of the supporting parts in the supporting fram's plane, between an operating or cycling position and a locked position.

7 Claims, 5 Drawing Sheets

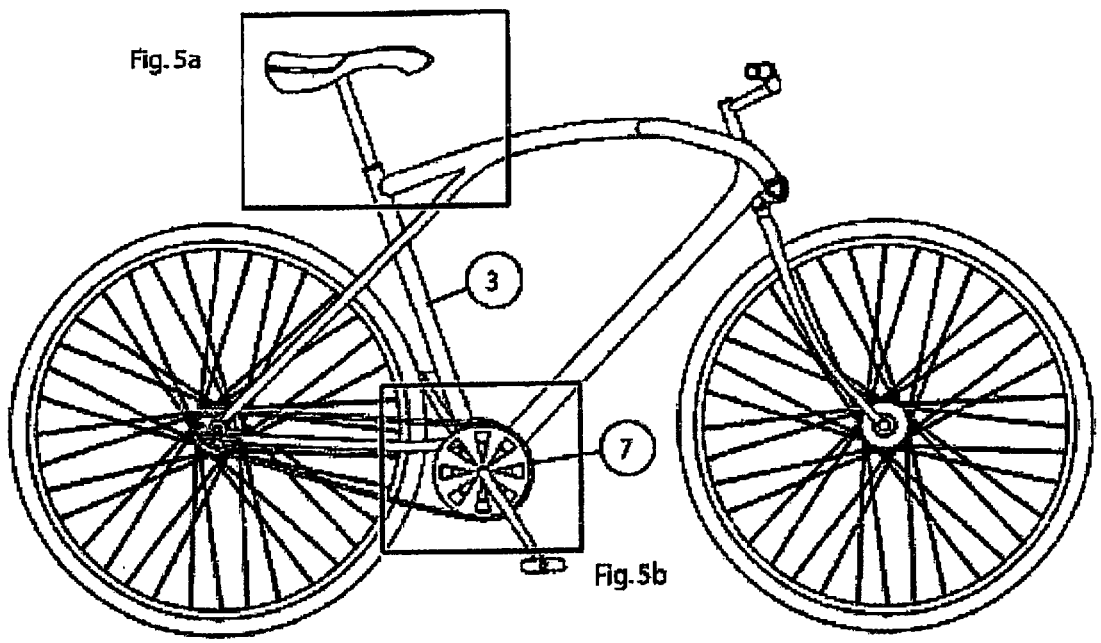
Fig. 5a
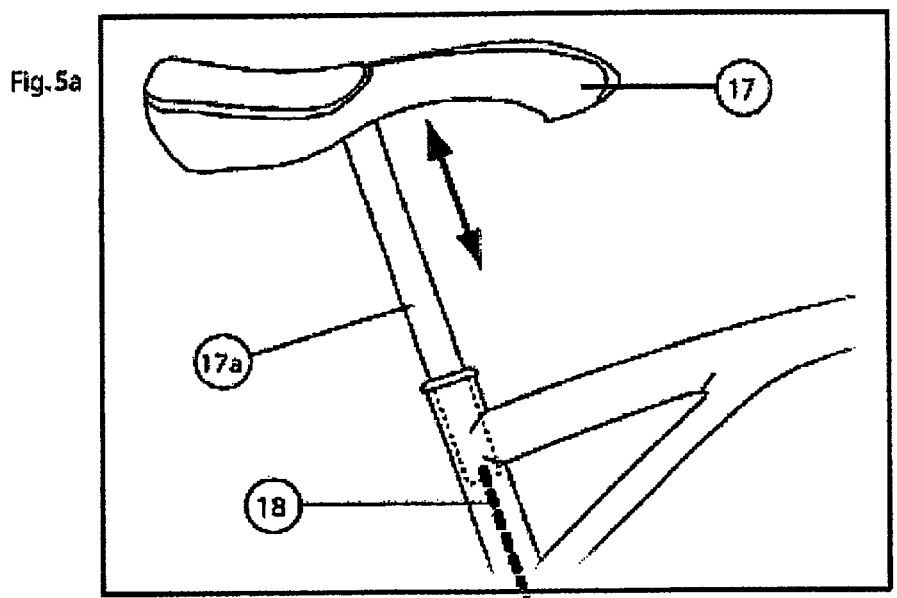
Fig. 5a
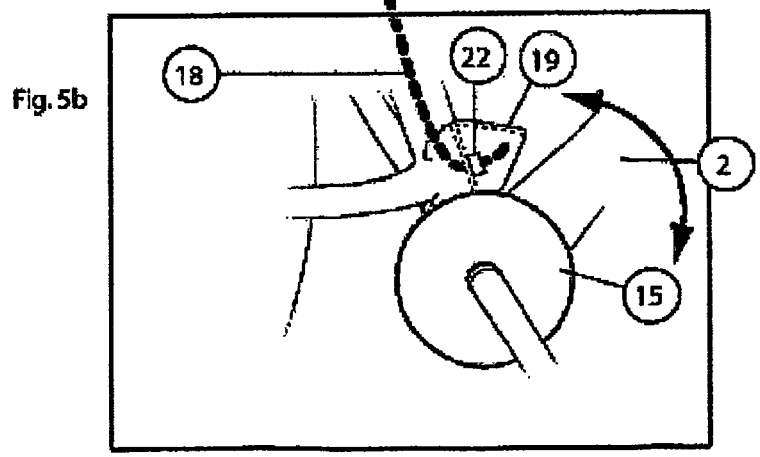
Fig. 5b
Fig. 5

ANTI-THEFT BICYCLE

The invention relates to an theft-proof bicycle, comprising a frame structure consisting of three frame parts connected so as to form a triangle, where the rod for the front wheel's supporting fork is attached to the front corner of the triangle, while the rear wheel's supporting fork structures are attached to the frame structure in the areas of the two other corners of the triangle.

On a worldwide basis around a hundred million bicycles are sold every year, 300,000 of which are in Norway and approximately 1.2 million altogether in Scandinavia. With such a large number of bicycles the problem of bicycle theft has also been steadily increasing. In the case of Norway, for example, statistics show that around 100,000 bicycles are involved every year. Despite an increased focus on the problem of bicycle theft in recent years, the number of thefts has not decreased.

Perhaps the most important obstacle to bicycle theft is the bicycle lock, which in recent times has only been further developed in the sense that there has been a steady improvement in the material of which the locks are made, thus making them more difficult to break open. At the same time, however, the bicycle thieves have developed new techniques for breaking the locks. An additional problem that has arisen is that parts of bicycles have been stolen, while the locked parts have been left behind. Thus in many places a bicycle wheel can be seen left locked to a post or the like, while the rest of the bicycle has disappeared, or if the frame is secured, both the wheels have been stolen. Nor has the problem of bicycle theft been solved by the other alternative that has been developed, viz. registration of the bicycle with the number in a register in order to facilitate recovery of the bicycle. Bicycles can easily be moved across frontiers and the police do not have sufficient capacity to check all bicycles with regard to their registration number.

Thus an obvious need exists for the development of new means for preventing bicycle theft.

The object of the present invention is to provide a theft-proof bicycle, which impedes theft of the bicycle to the greatest possible extent.

The further object of the invention is to provide means, the effect of which is to ensure that a bicycle whose lock is broken is no longer functional, thus being of no interest to the thief.

These objects are achieved with a theft-proof bicycle of the type mentioned in the introduction, which is characterised by what will be apparent in the patent claims.

One of the main ideas in the design of the bicycle according to the present invention is to construct the bicycle in such a manner that the bicycle frame and bicycle lock are equal, interdependent units. The invention is based on the concept that bicycle frame and bicycle lock are incorporated in one and the same functional unit. In order to function, therefore, the bicycle frame is dependent on an intact lock. If the lock is broken the bicycle frame becomes unusable and the bicycle is of no value. By means of a simple movement the bicycle is locked, and thereby preferably also the seat and the wheels, thus preventing any of the bicycle's parts from being removed.

According to the invention, in the bicycle's triangular frame there are inserted pivot joints, which permit parts of the supporting frame to be moved relative to one another in the supporting frame's plane. On movement of the frame parts, a fork-shaped end part on one of the frame parts can thereby be brought into a position whereby a locking pin with inbuilt lock can be passed through the wheels. When the bicycle is used the locking pin will ensure that the frame parts are secured to each other as a rigid structure. If the locking pin is shattered in an attempt at theft, it will no longer be possible to insert the pin in order to form the rigid frame and the bicycle will thereby become unusable. Thus it is important for the locking pin to be specially designed so that it is only the correct type of locking pin that can be employed and not any kind of pin.

In an advantageous embodiment that will provide the bicycle with maximum security, in the frame parts that are normally tubular, lines or wires are inserted in order to ensure that the rear wheel and seat are also secured against theft. This theft-protection is made possible on account of the ability to rotate or move the frame parts relative to one another. Thus when the frame parts are in a position where the front wheel is locked to the frame, the wire leading to the seat's rod, or to a security device at the rear wheel's fastening axle, will be tightened so that neither the wheel nor the seat can be removed.

The invention will now be described in greater detail by means of a preferred embodiment, which is set forth in the drawings, in which;

FIGS. 5, 5a and 5b are views illustrating securing of the bicycle's seat.

FIGS. 6, 6a and 6b are views illustrating securing of the bicycle's rear wheel.

Figure 4:
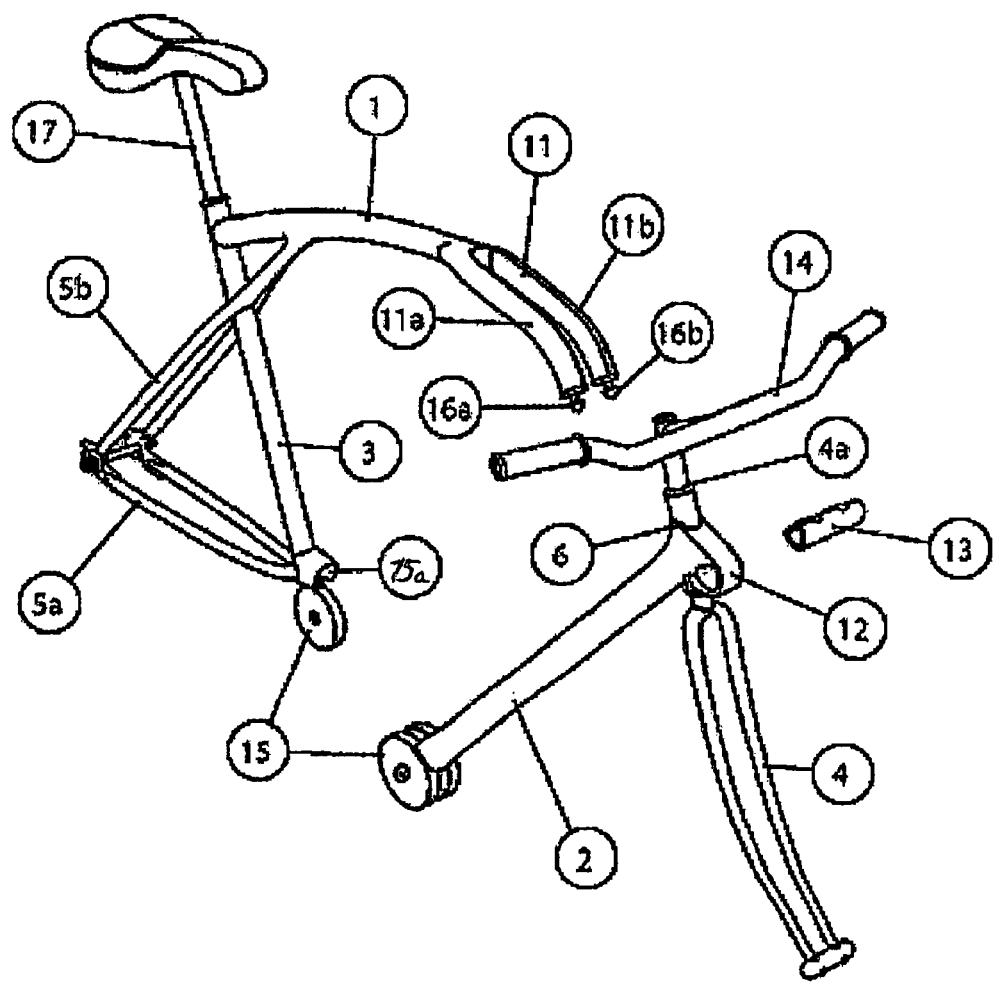
FIG. 4 is a view illustrating the parts of the frame structure, with the parts separated from one another and mounted to the wheels' attachment parts.

The bicycle according to the invention has a conventional triangular frame structure consisting of the frame parts 1, 2 and 3. The frame structure has corner points 6, 7 and 8. In the front frame corner or point 6 the frame structure is connected to the support part for the front wheel, which is a fork-shaped part 4 with an upper rod part 4a to which the handlebars 14 are attached. The rear wheel is attached by means of two standard fork parts 5a and 5b, which are affixed to the frame structure in the area of the corner point up in the triangle and the corner 7 where the crank for the pedals is also mounted. FIG. 4 illustrates the connection in the corner 7. A cover 15a is provided there whose function is described below. The wheels are indicated by 9 and 10. In the present design the frame structure is constructed with a pivot joint that enables the frame parts 1 and 3 to be moved relative to the frame part 2 in the frame's plane.

In the front frame corner 6 the frame part is attached by means of a sleeve piece to the rod in 4a on the front wheel's supporting fork 4 and a locking point 12 is provided here for mounting locking pin 13 with a bicycle lock. On the locking pin 13 is mounted a front fork-shaped part 11 with the fork prongs 11a and 11b, on the outside edges of which are provided pins 16a and 16b, which are affixed to the locking pin 13. A rigid structure is hereby provided, with the result that the bicycle with the fork part 11 locked by the locking pin 13 in the aperture 12 acts like a normal, conventional bicycle.

Figure 2:
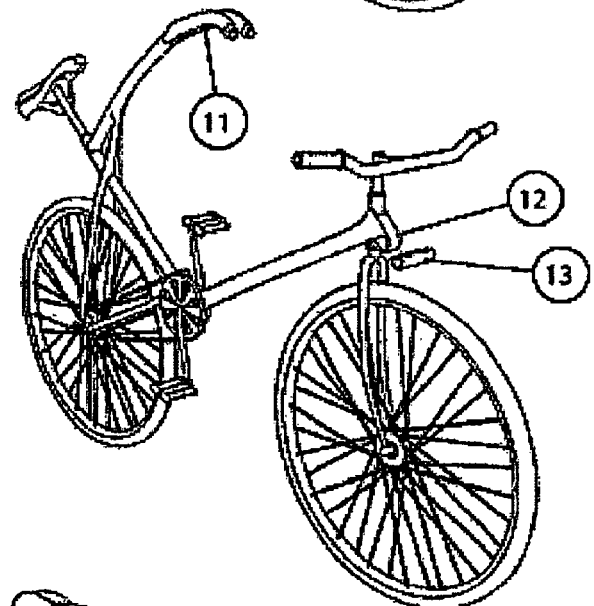
Figure 3:
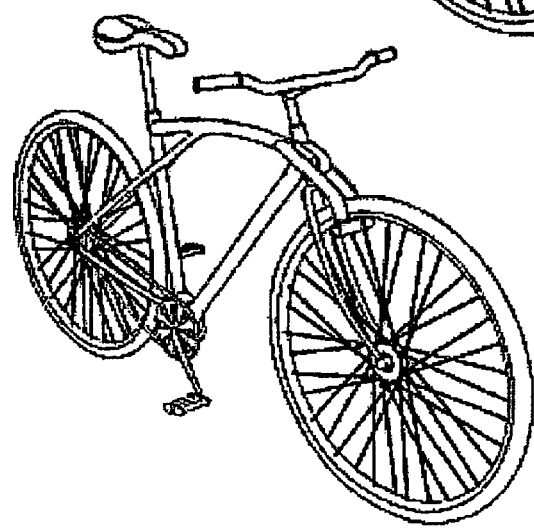
Figure 7:
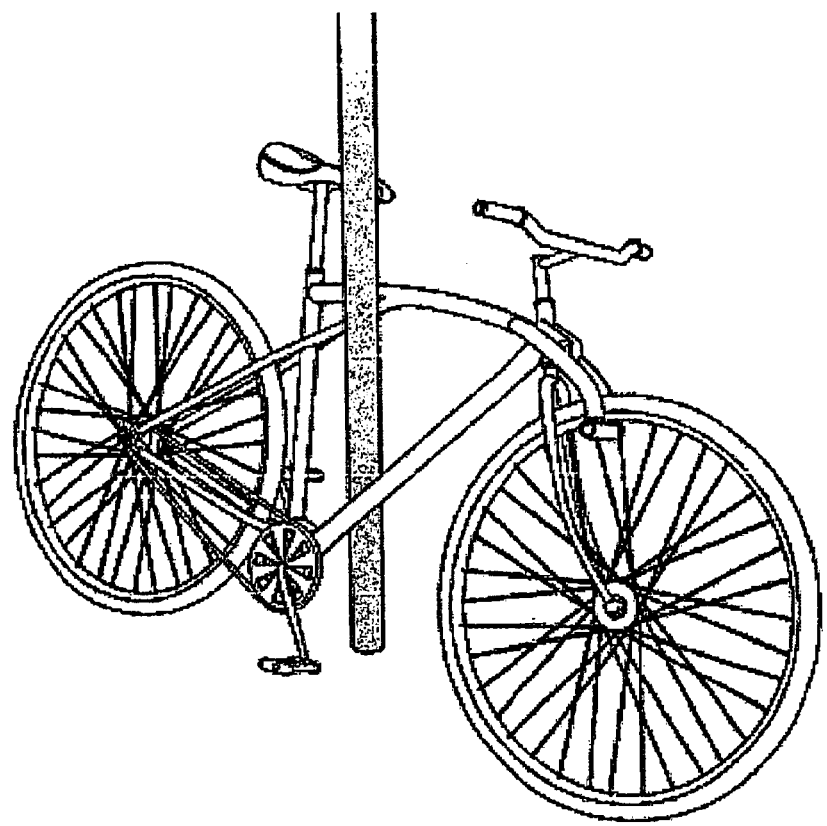
FIGS. 7 and 8 are views illustrating how the bicycle can be locked to a fixed object.
Figure 8:
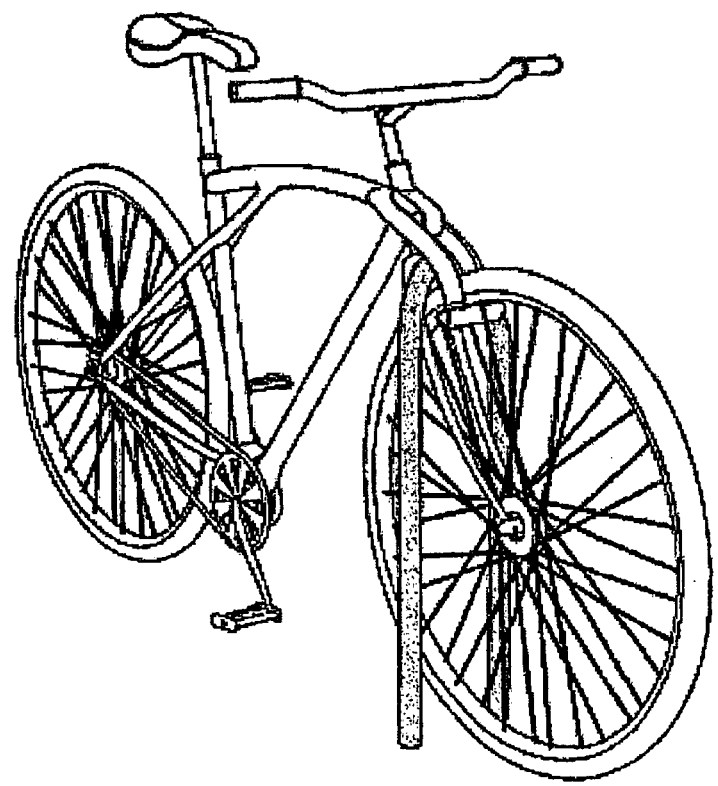

If the lock in the locking pin 13 is now unlocked and the locking pin removed from the aperture 12 as illustrated in FIG. 2, the frame part 1 and 3, which is rigidly connected in the corner 8, can be lifted out of the connection and the fork 11 can be moved forwards past the front wheel fork's rod 4a, with the result that the end of the fork 11 on the locking pins 16 comes inside the wheel's 9 periphery, thus enabling the locking pin now to be passed over the pins 16 and locked. This position is illustrated in FIG. 3. In this position it will not be possible to use the bicycle. The frame structure 1, 2 and 3 is compressed and will be unstable, while at the same time the locking pin secures the front wheel 9 in addition to preventing it from being rotated. In this position the bicycle will be unusable. FIGS. 7 and 8 illustrate how the bicycle can be additionally secured against theft on account of this kind of design. FIG. 7 illustrates how the bicycle frame, in the open position illustrated in FIG. 2, can be passed over a post or the like, thereby being additionally secured against removal.

If the bicycle has to be secured in a bicycle stand, this may be implemented, for example, as illustrated in FIG. 8, the beam of the bicycle stand thereby being located between frame and locking part.

The illustrated design thus permits a double protection.

However, not only entire bicycles are stolen, but also parts thereof. In order to secure oneself against theft of the bicycle seat, according to the invention non-flexible lines or wires are provided inside the frame structure's tubular frame parts. The arrangement and mode of operation thereof are schematically illustrated in FIG. 5, with the detail drawings 5a and 5b. FIG. 5a schematically illustrates by means of an arrow how a wire can be attached to the seat's 17 rod 17a. The wire 18 is passed down through the frame part 3, round a non-illustrated wheel in the corner 7 and the other end of the wire is attached to the frame part 2 by means of a nut under the cover 15a. The nut will only be accessible in the "open" position. If the frame part 2 is now rotated on locking the bicycle as illustrated in FIG. 3, the part 2 will be moved as illustrated by the double arrow in FIG. 5b and the wire 18 is pulled down tight, with the result that the rod 17a can no longer be pulled out of the frame part 3. The seat can therefore not be removed from the bicycle in the locked position. If the bicycle is moved back to the operating position as illustrated in FIG. 1a, however, the wire 18 will be slackened and the seat can be adjusted in the height direction and the rod can be pulled by the frame part 3.

Figure 1:
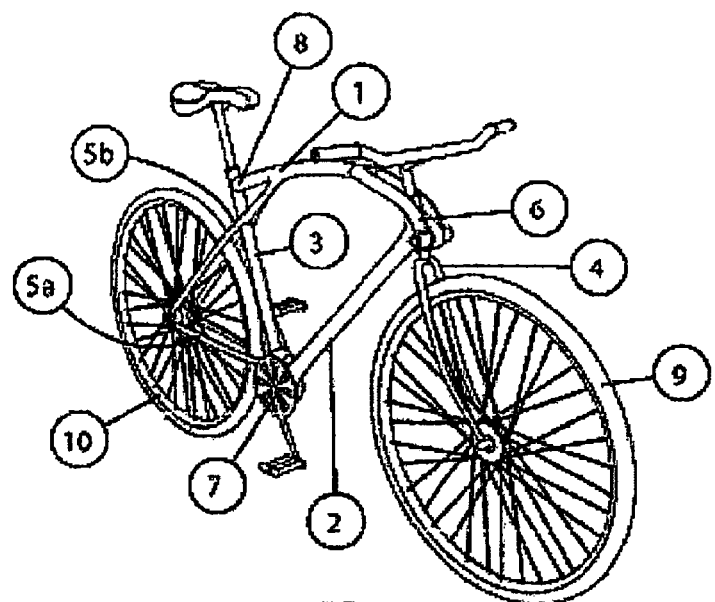
FIGS. 1, 2 and 3 illustrate a bicycle designed according to the invention in an operating or cycling position in FIG. 1, in FIG. 2 with the locking pin extended and ready for locking and in FIG. 3 in a locked position.
Figure 6:
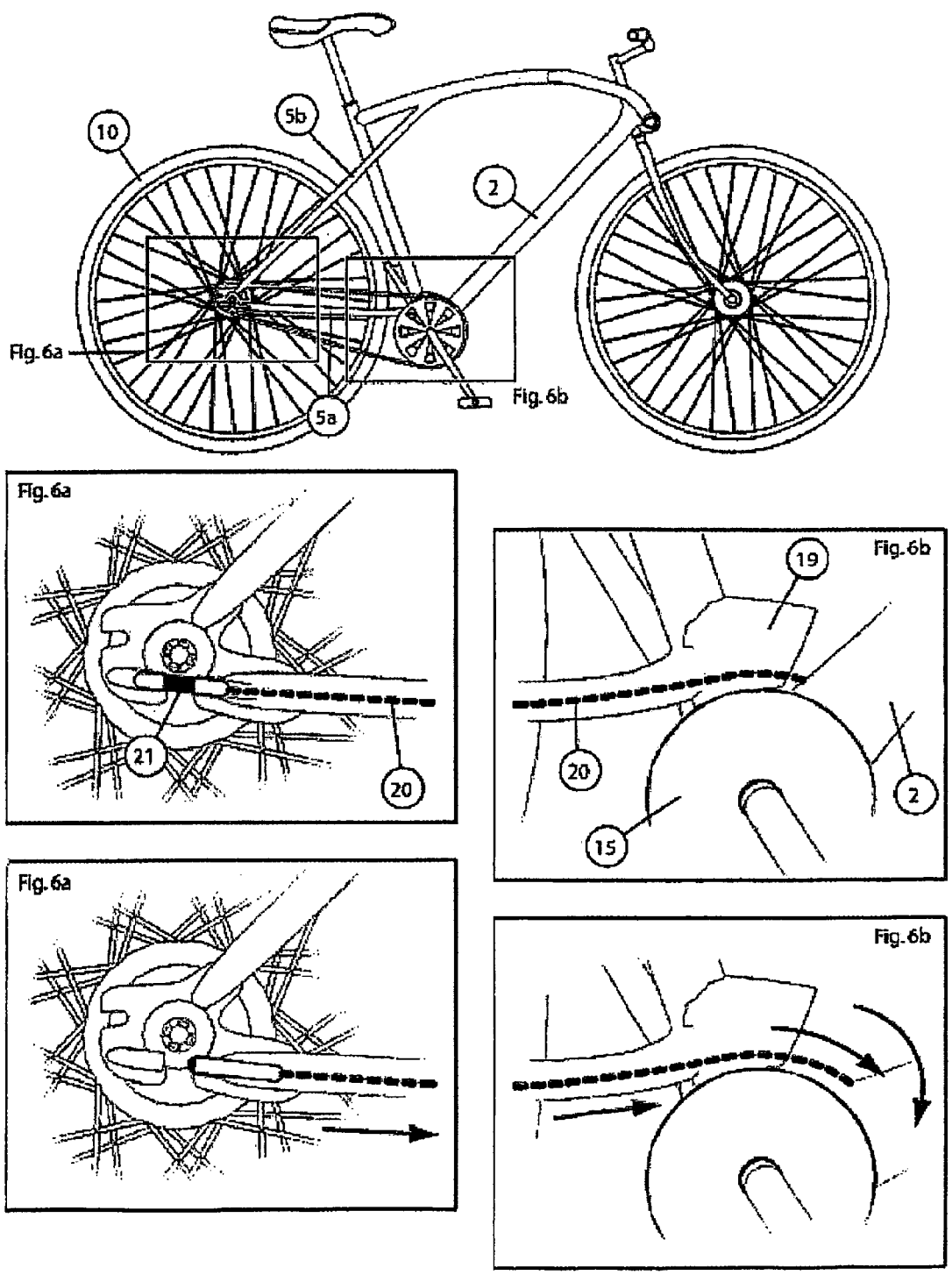

The same principle is employed for securing the rear wheel 10. This is illustrated in FIG. 6, with detail drawings 6a and 6b. The wheel 10 is attached to the frame part 5a and 5b by means of the wheel axle. The wheel may, for example, be secured by wing screws or by standard nuts. In the area of the wheel axle a securing device is arranged in the form of a spring-loaded bolt disposed at the end of a wire 20. The bolt is pulled by the wire 20 through one of the fork prongs of the fork Sa and passed through the pivot joint in the corner 7 and pulled by the frame part 2 where it is attached. By this means the rear wheel is also locked when the bicycle is in the locked position. If the bicycle is moved back to the position on the frame as illustrated in FIG. 1, the securing device will be able to be retracted and the wheel can be screwed off when required. A simpler solution may be for 21 to be made of a flexible material that extends through 5a and is attached under 15a in the same way as the seat. When the bicycle is in the open position, 21 is accessible and can be pulled forwards, releasing the rear wheel. In order to lock the wheel, 21 is pushed in under 19 again.

In the illustrated embodiment in the drawings, only one embodiment of the invention is illustrated, but many modifications will be possible within the scope of the invention. It may be envisaged, for example, that the fork part 11 is provided on the frame part 2 instead of on the frame part 1, while the frame part 1 is connected to the sleeve round the rod part 4a. The mode of operation according to the invention will remain the same, even though the parts are exchanged. With regard to the actual locking part, which is illustrated by pins 16, a wide range of variations will also be possible here. The vital factor here is that a special combination of coordinated parts is provided, with the result that not any kind of pin can be inserted for locking the parts together in the operating position. Similarly, it is possible to design the lock in many different ways. An alternative will also be with a padlock at the end of the pin.

With regard to the additional securing of the rear wheel and the seat, it will be natural to incorporate these additional securing means in a theft-proof bicycle, but these parts may be omitted in some variants.

A reverse design of the invention may also be envisaged, resulting in the rear wheel being locked instead of the front wheel. In such an embodiment the front wheel would have to be secured with wire instead of the rear wheel. Such embodiments are not illustrated in greater detail since it will be a simple matter for a person skilled in the art to design them on the basis of the present description.

What is claimed is:

1. A theft-proof bicycle comprising a frame structure consisting of three frame parts, a front (2) and a rear (3) slanting frame part and an intermediate transverse part (1), which are connected so as to form a triangle having a front corner (6), a bottom corner (7) and a back corner (8), where a handlebar stem (4a) between a handlebars (14) and a front wheel's supporting fork (4) is attached to the triangle's front corner (6), while a rear wheel's supporting fork structure (5a, 5b) is attached to the frame structure (1,2,3) in the areas of the two other corners (7,8) of the triangle and a pedal crank is arranged at the triangle's bottom corner (7), characterised in that frame parts (1,2) form the triangle's front corner (6), and that one of frame parts (1) or (2) is designed with a sleeve-shaped end part, through which the handlebar stem (4a) is passed, which sleeve-shaped end part has a locking part (12), which projects forwards out of the frame part, with a transverse, through-going aperture for inserting a locking pin (13), frame part (1) in the area of front corner (6) is designed as a two-pronged fork (11), one prong of which is passed on each side of the handlebar stem (4a), the ends of the fork's prongs (11a, 11b) being equipped with means (16a, 16b) for releasable cooperation with the locking pin (13) in order to form a fixed connection, and the frame structure (1,2,3) in the triangle's bottom corner (7) is equipped with a pivot joint (15) in order to permit a movement of the frame part (1) with the two-pronged fork (11) forward past the handlebar stem (4a), in the supporting frame's plane, between an operating or cycling position where the locking pin (13) is inserted in the through-going aperture and a locked position where the locking pin (13) is attached to the fork's prong (11a,11b) in front of the handlebar stem (4a).

2. A bicycle according to claim 1, characterised in that the frame structure, which is composed of tubes in its interior, is provided with an attachment lines (18), which is connected to a bicycle's seat (17) and a fixed point on the frame and with a length that ensures that in the locked position of the bicycle the line is held in a tightened position that prevents removal of the seat, and that the frame structure is also equipped with a line mechanism (20,21) for blocking the rear wheel attachment, the line being tightened in the same way as for the seat.

3. A bicycle according to claim 1, characterised in that the locking pin (13) is provided with grooves for cooperation with pins (16a,16b) mounted in the front part of the frame part's fork (11).

4. A bicycle according to claim 1, characterised in that the locking pin (13) is provided with a lock that prevents unauthorised opening.

5. A bicycle according to claim 2, characterised in that the length of attachment line (18) for securing the seat (17) is sufficient to permit the seat to be adjusted in height, but also arranged to ensure that when the frame structure (1,2,3) is located in the locked position, where the frame part from the pivot joint to the front corner is forwardly rotated, the line (18) is too short to enable the seat's rod (17a) to be extended.

6. A bicycle according to claim 2, characterised in that a line (20) or a wire is passed from the bottom corner where the pivot joint (15) is arranged, through the rear wheel's attachment fork to a sleeve device (21) at an attachment point for the rear wheel's axle, the length of the line being arranged to ensure that when the front frame part is rotated, the device will block the release of the rear wheel.

7. A bicycle according to claim 2, wherein the attachment line (18), is a wire.

* * * * *